Figure 1:
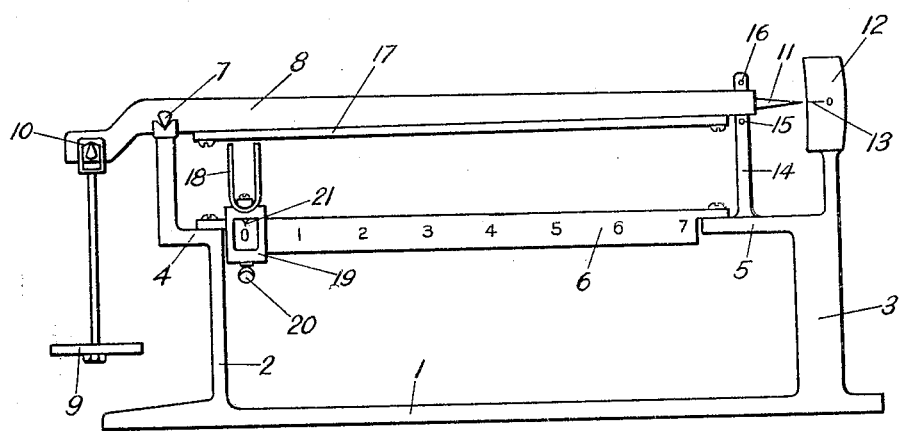

Oct. 4, 1932.  P. OKEY  1,881,060
WEIGHING SCALE STRUCTURE

Filed June 29, 1928

INVENTOR.
Perry Okey.
BY
ATTORNEY

Patented Oct. 4, 1932

1,881,060

UNITED STATES PATENT OFFICE

PERRY OKEY, OF COLUMBUS, OHIO, ASSIGNOR TO THE EXACT WEIGHT SCALE COMPANY, OF COLUMBUS, OHIO, A CORPORATION OF OHIO

WEIGHING SCALE STRUCTURE

Application filed June 29, 1928. Serial No. 289,161.

My invention relates to weighing scale structure. It has to do particularly with that type of scale known as the over and under weight scale and especially relates to scales wherein the article to be weighed is adapted to be balanced against a force applied to the long arm of a beam having an off-center fulcrum. It will, however, be understood that the principle of my invention may be applicable to other types of scales.

In previous constructions of scales of the type described, the force applied to the long arm of the off-center beam has usually taken the form of a weight slidable thereon, the beam being calibrated and cooperating with a pointer on the weight member to indicate, at the instant a condition of balance is attained, the weight of the article, which has been applied to the load pan. With scales of this type, the movement of the weight member along the beam produces a vibratory action of the beam which cannot be completely eliminated and which interferes with prompt and accurate reading of the calibrations.

One object of my invention is to provide a weighing scale of the type indicated wherein the movable scale beam does not carry any slidable weight members. I have accomplished this by the use of parts which utilize the principle of the varying arm of the beam without providing any element which is slidable on this beam.

More specifically, I preferably provide a beam having an off-center fulcrum with a load pan carried by the short arm of the beam and with a permanent magnet slidable on a calibrated bar and cooperating with the long arm of the beam to exert a force upon this long arm of the beam at varying points in its length. In order to accomplish this, I preferably provide the lower side of the long arm of the beam with a soft iron bar that forms an armature for cooperation with a permanent magnet slidably carried on a fixed horizontal bar in juxtaposition to the said iron bar. This horizontal bar is mounted beneath the long arm of the beam and is provided with properly disposed calibrations. The end of the long arm of the beam is provided with a pointer disposed in cooperative relation to a dial or other properly calibrated surface.

The preferred embodiment of my invention is shown in the acompanying drawing wherein similar characters of reference designate corresponding parts and wherein:

The figure is a side elevation of a scale structure embodying the essential elements of my invention.

In the drawing, I have shown a scale frame comprising a base 1 and an upright or standard 2 adjacent one end thereof and with an upright or standard 3 adjacent the opposite end thereof. The standards 2 and 3 are preferably provided with shelves 4 and 5 for the support of a horizontal calibrated bar 6. The bar 6 is immovably mounted upon these shelves.

The upper end of the standard 2 is preferably bifurcated and provided with bearing surfaces adapted for the reception of knife-edge trunnions 7 of an off-center beam 8. Suspended from the short arm of this beam 8 is a load pan 9 which is likewise supported by knife-edge bearings 10. The free end of the long arm of the beam 8 is provided with a pointer 11 designed to cooperate with an indicating dial 12, this dial having a center line marking 13 thereon. The dial 12 is preferably carried upon the upper end of the standard 3 and this standard 3 also carries an upright 14 having stops 15 and 16 for limiting the up or down movements of the free end of the long arm of the beam 8.

It will be noted that the stop 16 precludes any but a very slight downward movement of the long arm of the beam 8. It also entirely prevents the armature 17 from coming in contact with the permanent magnet 18.

The under surface of the long arm of the beam 8 has attached thereto a soft iron bar 17 which constitutes an armature. This armature is disposed in cooperative relation with a permanent magnet 18 carried by a slide 19. This slide 19 is mounted upon the horizontal bar 6 and is freely slidable thereon. It is provided with a handle 20 and with an indicating pointer 21 which is disposed for cooperation with the various calibrations upon the bar 6.

In operation, the permanent magnet 18, carried by the slide 19 is so mounted that it will move in parallelism with and in proximity to the soft iron bar 17. When it is desired to weigh an article to determine whether or not it is of proper weight, the slide 19 is moved to such a position upon the horizontal bar 6 that the indicator 21 will point to the proper calibration upon this bar. Then, the load to be measured is placed upon the load pan and, if it is of proper weight, it will exactly counterbalance the force of the permanent magnet exerted at that point on the long arm of the beam. If this article to be measured balances the force exerted by the permanent magnet, the pointer 11 will exactly coincide with the center line 13 on the dial 12. If the article to be measured is over weight, the pointer will be above the center line 13 while, if the article to be measured is under weight, the pointer will be below the center line of the dial 13.

It will be understood that the permanent magnet 18 is so mounted in relation to the long arm of the beam 8 that, when this beam 8 has its pointer 11 in register with the center line 13, the magnet will always move in parallelism to and in proximity with the soft iron bar 17. It will also be understood that the beam may be of such construction and the center of gravity of this beam and its appurtenances may be so located that it will appropriately compensate for variation of the pull of the magnet as the distance between the armature bar 17 and the magnet may vary.

It will be seen that I have provided an extremely simple type of weighing scale wherein the counterbalancing effect of a member slidable along the long arm of the scale beam is obtained without the drawback of having this slidable member mounted upon the beam. Likewise, various other constructions may be used without departing from the principles of my invention.

Having thus described my invention, what I claim is:

1. In a weighing scale, a beam, an iron bar attached longitudinally to the beam, and a permanent magnet slidably mounted in adjacent relation to said iron bar to develop varying off-center forces on said beam.

2. In a weighing scale, a beam, and means devoid of mechanical connection with said beam for exerting a pull on said beam to off-set the load, said means being adjustable longitudinally of the beam to vary the point of application of such pull.

3. In a weighing scale, a beam, a calibrated bar located in juxtaposition to one arm of said beam, and a magnet effective upon such arm of said beam and slidable along said calibrated bar to vary the point of application of its effectiveness upon said beam.

4. In a weighing scale, a beam, a pointer movable in response to the movement of said beam, a center line for cooperation with said pointer, a calibrated bar extending in substantial parallelism with one arm of said beam, and a magnet slidable along said bar in a position to exert a force upon such arm of said beam at variable points of application.

5. In a weighing scale, a beam, a pointer movable in response to the movement of said beam, a center line for cooperation with said pointer, and a magnet mounted independently of said beam for applying a pull upon one arm of said beam at variable points.

6. In a weighing scale, a beam, a load pan on one arm of said beam, and a magnet movable into different positions for applying a pull to varying points on the other arm of said beam to off-set the pull of said load pan.

7. In a weighing scale, a beam, and means devoid of mechanical connection with said beam for exerting a depressing force on one end thereof, said means being adjustable so that the force may be applied at different points along the beam.

8. In a weighing scale, a beam, and means devoid of mechanical connection with said beam for exerting a depressing force on one end thereof, said means being adjustable so that the force may be applied at different points along the beam, and means for limiting the up and down movement of said beam.

9. In a weighing scale, a beam, a magnet for exerting a force upon said beam at variable points along said beam to cause depression thereof, and means for limiting the movement of said beam towards said magnet.

10. In a weighing scale, a beam, a magnet for exerting a force upon said beam at variable points along said beam as to cause depression thereof, and means for limiting the movement of said beam away from said magnet.

11. In a weighing scale, a beam, a magnet for exerting a depressing force upon said beam, said magnet being mounted for adjustment along said beam to vary the mechanical advantage, and means for limiting the movement of said beam toward or away from said magnet.

12. In a weighing scale, a beam, and means for applying a depressing force to said beam, said means being of such a nature and so mounted that it will be devoid of mechanical connection with said beam and may be adjusted to apply its force at various positions along said beam.

In testimony whereof I hereby affix my signature.

PERRY OKEY.